Sept. 16, 1958

A. P. DOUGLAS ET AL 2,852,272

TRICYCLE CONSTRUCTION

Filed April 12, 1957

INVENTORS
ALVIN P. DOUGLAS
GILBERT B. HAHN
BY *Golrick & Golrick*
ATTORNEYS

Sept. 16, 1958     A. P. DOUGLAS ET AL     2,852,272
TRICYCLE CONSTRUCTION

Filed April 12, 1957     2 Sheets-Sheet 2

INVENTORS
ALVIN P. DOUGLAS
GILBERT B. HAHN
BY Gobrick & Gobrick
ATTORNEYS

United States Patent Office 2,852,272
Patented Sept. 16, 1958

2,852,272
TRICYCLE CONSTRUCTION

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application April 12, 1957, Serial No. 652,555

6 Claims. (Cl. 280—274)

This invention pertains to tricycles and the general object thereof is the provision of a novel tricycle frame construction.

More specifically the object of the present invention is the provision of a unique tricycle frame construction of a twin tube type which will be sturdy in construction, appealing in appearance and economical in manufacture.

A further object is the provision of a frame head construction for a tricycle which permits of the elimination of a fork bearing tube.

A still further object of the invention is the provision of a twin tube and platform connection for a tricycle frame.

Another object of the present invention is to provide a tricycle frame construction having two identical approximately Z-shaped frame tubes and wherein the necessity of the formation of right and left hand tube shapes is eliminated.

Other objects of the invention will become apparent to those skilled in the art from the following description referring to the accompanying drawings showing a preferred embodiment thereof. The essential characteristics are summarized in the claims.

Referring to the drawings.

Figure 1:
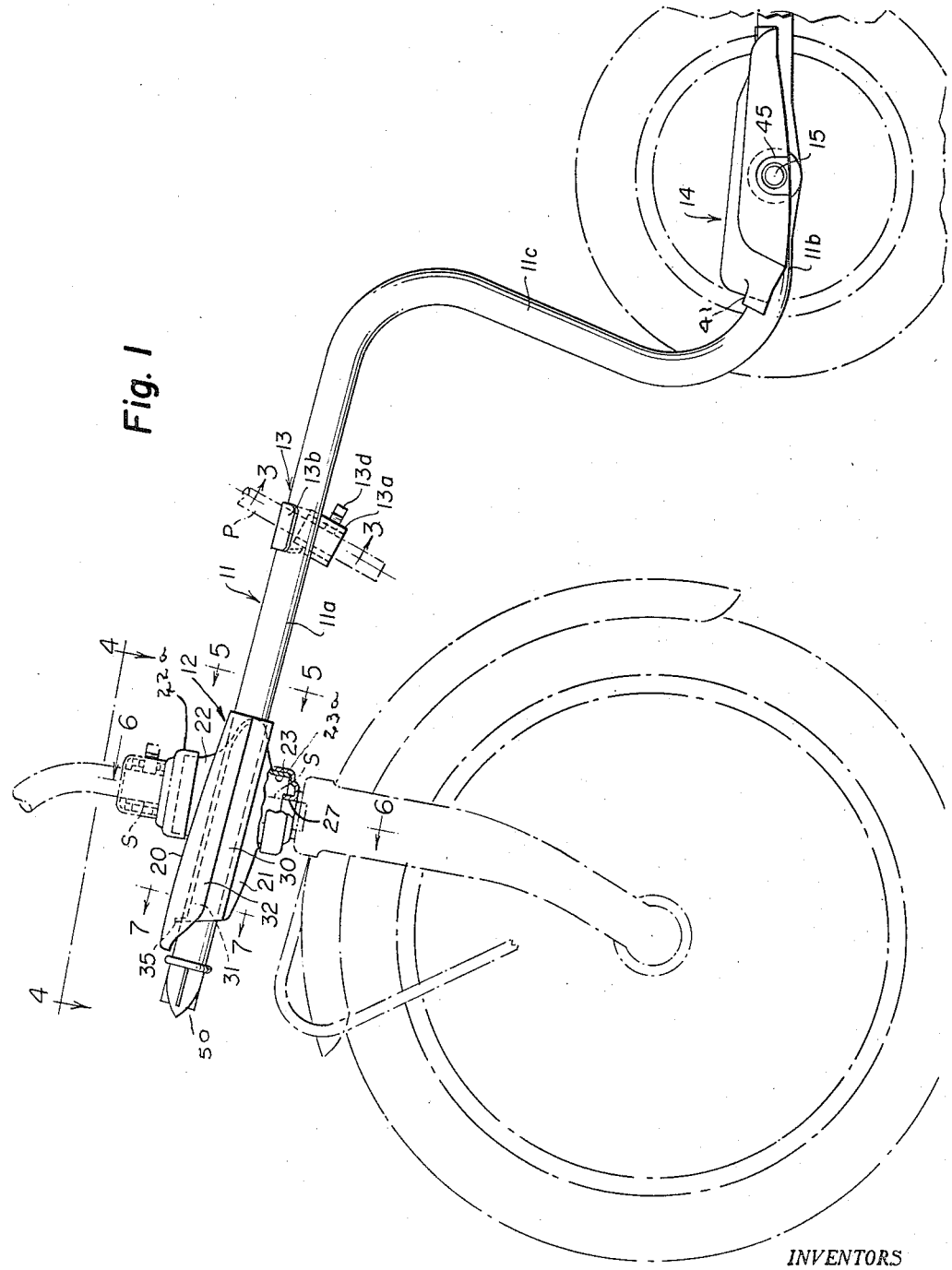
Fig. 1 is a side elevation of the frame of this invention.
Figure 2:
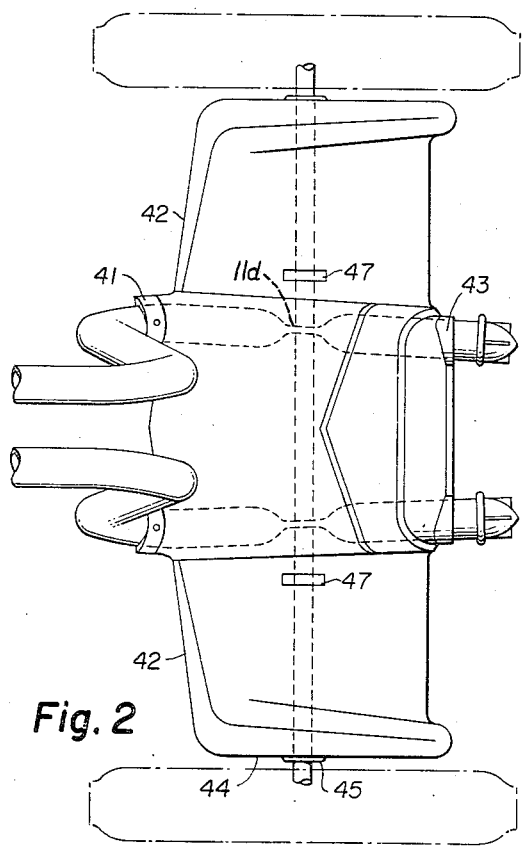
Fig. 2 is a plan view of the rear platform area of a vehicle utilizing a frame of this invention.

The present tricycle frame comprises, as principal components brazed together as hereinafter described, a pair of identical roughly Z-shaped frame tubes 11, with longer rearwardly sloping upper reaches 11a secured in laterally spaced parallel relation in and by a composite head structure 12, an intermediate tube spacing and seat supporting bridge 13, and a rear platform structure 14 supported by the generally horizontal rear tube reaches 11b and the underlying rear axles 15. The reaches 11a, b, c of a tube are coplanar. To obtain a broader supporting base for the rear platform, the rear reaches of the tubes are spread, by rotation about the axes of the upper reaches 11a; and it may be noted this results in a slight rearward convergency of the rear reaches due to the fact that the included acute angle of the connecting reaches 11c with respect to the lower reaches is less than that with the upper reaches. At near mid-length of the lower or rear reach, each tube is collapsed upon itself forming a flat portion 11d parallel to the plane of the tube, and there perforated to accommodate the transverse axle 15.

Figure 6:
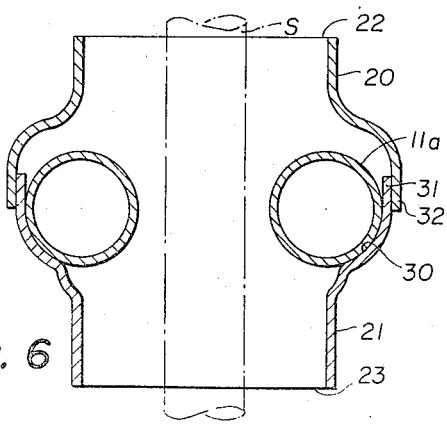
Fig. 6 is a transverse vertical section of the head taken as indicated by the line 6—6 in Fig. 1.

In the head structure 12, enclosing the front extended ends of the upper reaches, upper and lower stamped or drawn sheet metal members 20, 21 are formed with certain portions adapted to provide partial seats conforming to the annular curvature of the frame tubes and for longitudinally extended contact with each other to provide brazing areas for furnace brazing; and each is provided with a large outwardly cylindrical flanged aperture, through which the steering fork stem S extends with clearance relative to the tube reaches. The upper and lower flanges 22, 23, of identical diameter and coaxially aligned (see Fig. 6), are provided with identical centrally apertured cap members 22a and 23a respectively press-fitted thereon an having inward cylindrical flanges 27 forming extended bearing surfaces for the fork stem.

Figure 4:
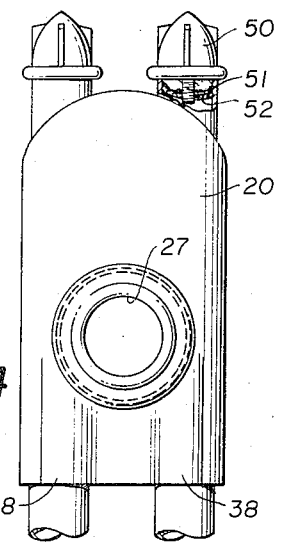
Fig. 4 is a plan view of the head construction of the frame taken as indicated by 4—4 in Fig. 1.
Figure 5:
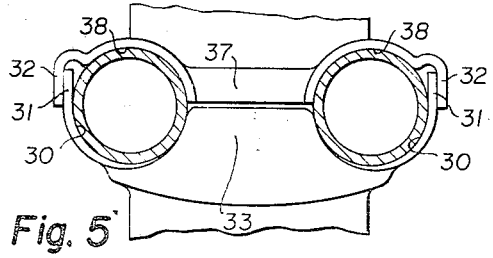
Fig. 5 is an end view of the head construction taken as indicated by the line 5—5 in Fig. 1.
Figure 7:
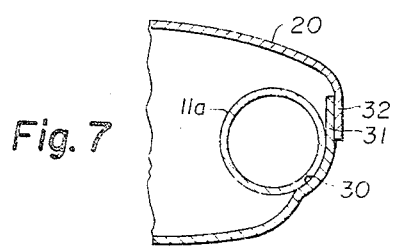
Fig. 7 is a transverse vertical section of the head taken as indicated by 7—7 in Fig. 1.

The form of the head members in relation to the tubes and to each other may be seen from Figs. 1 and 4 taken in conjunction with the outline sections 5-7 inclusive. The downwardly dished lower member 21 has at each side a longtudinally extending partial seat 30 arcuate in cross section to conform to part of the circumference of a corresponding tube 11 and longitudinal upward lateral edge flanges 31 conforming to the interior of lateral edges or skirts 32 of the upper head member 20 into which the underside member 21 is fitted to provide lap joints (see Figs. 5, 6, 7). The back end of the under member 21 is curved upwardly from the flange 23—the tubes terminating substantially at the plane of the tube axis to form a tube spacing formation or tongue 33, while the adjacent portion of the tube seats 30 at this region are shown as merging into the tongue and are extended to approach a semi-circular angular range of tube engagement.

In like fashion the front end of the lower member 21 is brought up, somewhat more sharply between the tubes in a tube spacing tongue formation 35. The latter may be brought up to the bottom surface of member 20 to provide forward support therefor. The upper head member 20, in addition to its upwardly dished structure providing the aforementioned skirt or longitudinal side flanges 32 and the upward flange 22, is curved downward between the tubes at 37 and is formed with short curved tube seats 38 just inward from the side skirts (see Figs. 4 and 5); while the front at a location spaced forward of the front of member 21, is dropped in a flange or skirt as a decorative and strengthening formation carried down about the upper halves of the tubes.

Figure 3:
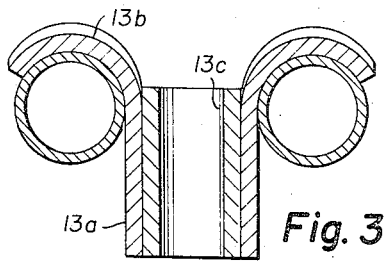
Fig. 3 is a section of a seat anchoring and bridge member of the frame taken as indicated by the line 3—3 of Fig. 1.

To provide further spacing support for the upper tube reaches and also a seat anchor, the member 13 is spaced rearwardly from the head and spot welded (and subsequently brazed) to the tubes at a location which allows convenient leg reach to the front wheel pedals of the tricycle. As may be gathered from Figs. 1 and 3, the member 13 is a composite clip with a hollow cylindrical body 13a from the top of which extend laterally a pair of integral curved ears 13b, and a cylindrical insert 13c press fitted into the body and preferably spot welded thereto. The ears 13b are shaped to embrace upper parts of the tubes, being as it were portions of cylindrical shells, parallel and at an angle somewhat less than 90° to the body 13a to give a suitable rear inclination to a seat post P (shown in dotted outline), which is held at adjustable height by the usual set screw 13d threaded through the body and insert. The body 13a with integral ears 13b and likewise the insert 13c may be blanked out of sheet metal in flat form and thereafter curled to give the final form shown, thereafter being brought together in a subassembly by methods well known in the art.

The horizontally extended platform 14 is a single sheet metal stamping structurally reinforced for rigidity by downward flanges or skirts continuous across the front sides and along the rear inwardly at least to a region of engagement with the rear ends of the tube.

For rigid attachment by brazing the platform engages the tubes in the downwardly concave nearly semi-cylindrical seat formations 41 in the front flange 42 at the region where the lower reaches 11b start to curve into the connecting reaches 11c; and also, at a region spaced slightly from the back ends of the lower reaches, in similar seats 43 at the back edge of the platform. The lateral flanges 44 are outwardly bossed and apertured at 45 for the back axle 15 to extend therethrough. The apertures in the flattened tube portions 11d at least in a direction transverse to the tube axis are oversized with respect to and for accommodation of the rear axle diameter, since the geometry of the assembled frame is such that the planes of the flats are inclined to each other and the direction of the axle. At each side outboard of the lower tube a portion of the platform is depressed downwardly to form a small axle seat 47 on the bottom of the platform to which the axle is welded or brazed. Thus the platform is rigidly secured to the tubes at well spaced points.

It will be noted in Fig. 1 that the flange structures 22 and 23 of the head construction have cap members 22a and 23a fitted thereon and are shaped to comprise bearings members for the fork bearing tube or element. Thus the disclosed head structure eliminates the conventional head bearing tube mounting.

The forward and rearward ends of the extended tubes are provided with reflector lights 50 mounted on a metal base having a threaded shank 51 which engages a spring or speed nut 52 shaped to expand radially and grip the inner surface of the tube. To this end the metal base is firmly attached to the reflector lens 50 so that when the speed nut is assembled on the threaded shank the nut may be pushed into the tube and turning of the lens to expand the spring nut 52 will effect securement of the lens on the end of the tube.

In assembling the frame, the Z-shaped tubes are properly positioned relative to each other; the bridge member 13 is spot-welded therebetween and the platform is spot-welded at the seats 41, 43. The axle, if desired, may then be spot-welded at seats 47 to the platform. Members 20 and 21 are then positioned on the front end of the tubes. Thereafter a suitable brazing composition such as a copper brazing paste is applied to the region of joining of the tubes to member 13 and platform members 20 and 21, also of joining of axle to platform and of tubes, if the axle be in place, and the entire assembly is passed through a hydrogen brazing furnace or the like to complete the brazing. Alternatively the axle may be positioned and spot-welded at seats 47 after the brazing is completed.

We claim:

1. A twin tube tricycle frame comprising two identical parallel tubes with upper reaches thereof spaced apart and parallel and the lower rear end portions flared apart by turning the tubes about the centers of the parallel upper reaches of the tubes, a platform and axle mounting secured to the flared apart portions and a head structure spanning the forward portions of the spaced apart parallel reaches of the two tubes and having upper and lower drawn annular flanges constituting bearing supports for the fork of a tricycle.

2. A tricycle frame construction comprising two identical spaced apart parallel tubes with the rear portions flared apart by turning the parallel portions of the tubes about the parallel centers thereof, a fork support spanning the forward portions of the tubes, said support consisting of upper and lower hollow members formed to have tube seats for the parallel portions of the tubes and each of said members having annular fork bearing supporting portions.

3. A tricycle frame construction comprising two spaced apart parallel tubes having the rear portions thereof flared apart by turning the parallel portions of the tubes about the parallel centers thereof, a fork support spanning the forward portions of the tubes and forming the head of the frame structure, said support consisting of upper and lower hollow members formed to have parallel seats for the tubes and each of said members having annular fork bearing supporting portions extending vertically in alignment to support the fork stem of a tricycle above and below the parallel tubes.

4. A twin tube tricycle frame comprising two approximately Z-shaped tubes with upper reaches thereof spaced apart and parallel and the lower rear end portions flared apart by turning the upper reaches about their longitudinal axes, a platform and axle mounting secured to the flared apart portions, and a head structure spanning the forward portions of the spaced apart parallel reaches of the two tubes, said head structure being formed of two stamped members telescopically fitted together to form a hollow frame head structure and a bearing support for the fork of a tricycle said stamped members having outwardly drawn and aligned annular formations serving as bearing supports for the fork stem.

5. In a tricycle, a frame structure comprising two identical approximately Z-shaped tubes arranged in straight spaced apart parallel relation in the upper part of the Z formation and with the lower parts of the Z formation flared apart, a platform structure attached to the flared apart portions of the tubes, a seat post supporting means disposed between and spanning the tubes, a frame head structure spanning the forward portions of the tubes comprising an upper and a lower hollow stamping longitudinally fitted together to embrace the spaced apart parallel tubes, the upper and lower stampings having aligned drawn annular flanges and fork bearing cap members fixed to the annular flanges thereby to support the bearing tube element of a tricycle fork above and below the spaced apart tubes.

6. A twin tube tricycle frame construction comprising two substantially identically shaped tubular members having upper parallel portions and lower rearwardly extending portions with downwardly extending portions connecting the upper and lower portions, said lower portions being spaced apart by turning the tubular members about the axes of the upper portions whereby the lower portions are disposed in nonparallel relation, a rear platform structure connected to the spaced apart nonparallel lower portions of the tubes, said platform having nonparallel tube seats formed in the under side thereof to bear upon and be fixed to the lower nonparallel portions of the substantially identically shaped tubular members and said platform having a downwardly extending marginal flange at rear, front and sides thereof and an axle extending through the side flanges of the platform and the nonparallel lower portions of the tubes.

References Cited in the file of this patent

UNITED STATES PATENTS

| | | |
|---|---|---|
| 2,009,571 | Anderson | July 30, 1935 |
| 2,158,618 | Dobrowolski | May 16, 1939 |
| 2,202,479 | Bullock | May 28, 1940 |
| 2,232,661 | Hedstrom | Feb. 18, 1941 |
| 2,335,583 | Conti | Nov. 30, 1943 |
| 2,338,730 | Morgan et al. | Jan. 11, 1944 |
| 2,479,538 | Liljenberg | Aug. 16, 1949 |